May 5, 1964
T. H. DALTON
3,131,674
SAFETY DOG COLLAR
Filed April 17, 1963
2 Sheets-Sheet 1
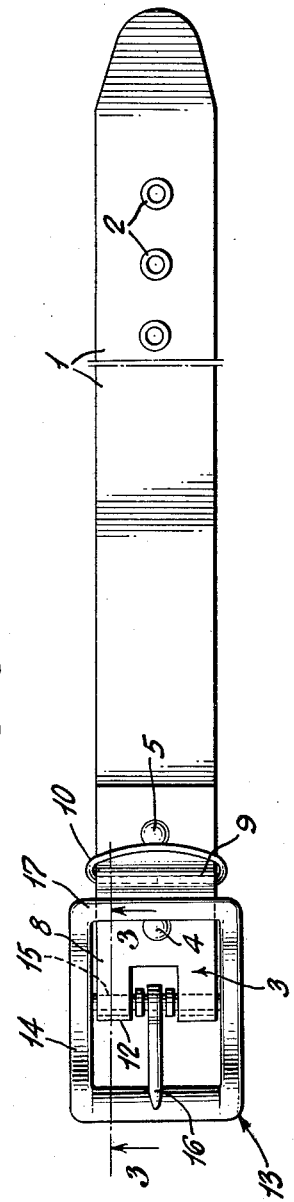
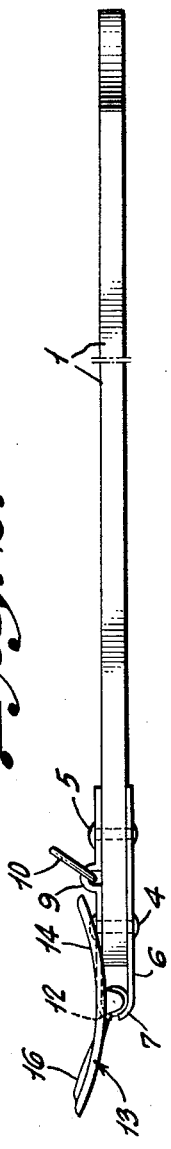
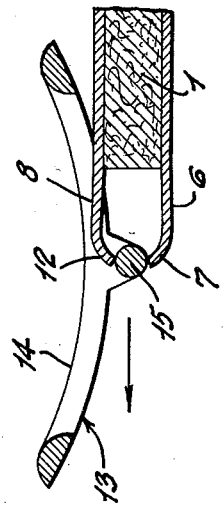
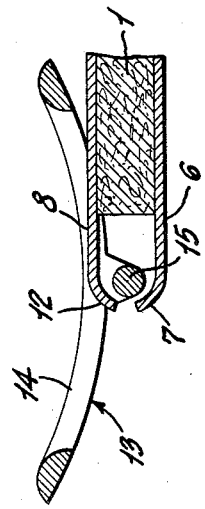
INVENTOR
THOMAS HOWARD DALTON
BY R. Hurston Brett
ATTORNEY May 5, 1964  T. H. DALTON  3,131,674
SAFETY DOG COLLAR Filed April 17, 1963  2 Sheets-Sheet 2

INVENTOR
THOMAS HOWARD DALTON

BY

ATTORNEY

United States Patent Office

3,131,674
Patented May 5, 1964

3,131,674
SAFETY DOG COLLAR
Thomas Howard Dalton, Chesterfield, Va.
(6402 Cabin Creek Drive, Richmond, Va.)
Filed Apr. 17, 1963, Ser. No. 273,685
4 Claims. (Cl. 119—106)

This invention relates to a new and useful improvement in a safety collar, and more particularly to such collars adapted for attachment to the canine species, and especially to dogs used for hunting.

While this invention may be used on many types of animals, such, for instance, as cats and the like; yet, for purposes of illustration, attention is here directed to collared dogs used by human beings for hunting purposes as well as pets. It is well known in the art of hunting that a dog tracking its quarry pays little or no attention to its safety. When so hunting, a dog will explore thickets, underbrush and burrows, thereby subjecting itself to the hazard of having its collar entangled in such objects. There are many instances where a dog has perished because of being unable to free itself from a collar caught in an object. Even when dogs are kept as pets, they are often left alone in confinement, and are likewise subjected to the hazard of having its collars become entangled in an object. So it is though obvious that a collar incapable of being released by the dog is a great hazard.

One of the objects of this invention is the provision of a collar adapted to become disengaged from a dog upon the application of a suitable force.

Another object of this invention is the provision of a dog collar that may be disengaged from a dog by the application of a suitable force, or secured against such disengagement.

Figure 6:
Figure 5:
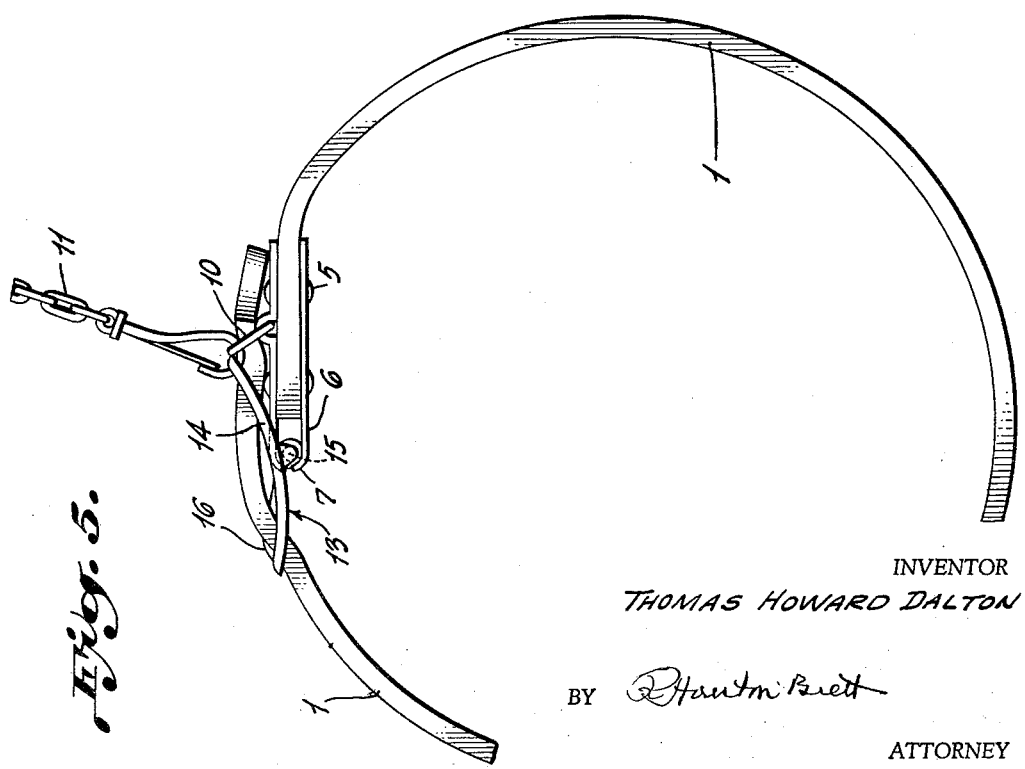

Other objects and features will more fully appear from the following description and accompanying drawings, in which:

FIG. 1 is a top plan view of the collar,

FIG. 2 a side elevational view of the same,

FIG. 3 an enlarged sectional view taken along line 3—3 of FIG. 1,

FIG. 4, an enlarged sectional view illustrating the manner of separating the buckle from the neck-band, FIG. 5 is a side elevational view of the collar showing the means of permanently securing same, and FIG. 6 is a pictorial view to illustrate the manner in which a dog may free itself from a collar.

Referring more particularly to the drawings the collar is designated by the numeral 1. The well known neck-band of the collar is provided with the usual eyelets 2 and is generally made of any material possessing flexible qualities. A latch 3 consists of a pair of plates 6 and 8 respectively secured to the bottom and top of said neck-band by rivets 4 and 5. Plate 8 has a keeper 9 that is formed therein, and is adapted to acommodate a ring 10 secured thereto in pivotal fashion.

The end portions of plates 6 and 8 extend beyond the band end to which they are connected so as to form a chamber. Each of said plates is provided with a recess, one over the other, in a plane coincident with each other. It is thought obvious that the lower plate 6 is provided with fingers 7 extending upwardly, while the upper plate has similar companion fingers 12 extending downwardly; said upper and lower fingers being in spaced relation to each other to permit ingress and egress of an object.

A buckle 13 consists of a frame 14 having an axle 15 secured to and spanning its frame. A dog or stay 16 is mounted on said axle in pivotal fashion and is held against substantial lateral displacement by stops mounted on the axle; all of which is clearly shown in FIG. 1. A rear shank 17 of the buckle frame is in operative relation with ring 10, and the two are adapted to be secured together by a catch on a leash 11, as clearly shown in FIG. 5, and more fully hereinafter explained.

The device functions as follows: The neck-band of the collar is placed about the dog's neck, and the axle is inserted or "snapped" into the chamber by forcing it through the space between fingers 7 and 12.

The plates are made of material that provides sufficient strength so as to prevent axle 15 from becoming disengaged from the said chamber by any normal force exerted through the axle upon them. Thus, the collar is locked upon the dog's neck in detachable fashion. However, should the dog (FIG. 6) get his collar entangled in an object; then is when it begins to twist and turn in its endeavor to become released, and by exerting such abnormal force upon the collar, the axle will be forced out of the chamber, and the collar thus opened to permit the dog to gain its freedom.

If it is desired to prevent the collar from being removed from the dog a latch, such as shown on leash 11, may be secured to shank 17 and ring 10, thereby preventing the opening of the collar. Thus, it is thought obvious that by the provision of the foregoing device, a safety collar is provided whereby a dog may exert a suitable force to free itself or a collar may be provided to prevent the dog being released therefrom.

It is also thought obvious that the recesses provide adequate space in which the stay and stops may operate. While the device is shown in its preferred form, nevertheless, an axle may be attached to the free end of the neckband in any suitable fashion, and "snapped" into the latch as hereinbefore described.

Having described this invention, what is claimed is:

1. A collar for attachment to a dog, consisting of a neck-band having a pressure releasable latch comprising an upper and lower plate secured to one end of said band respectively at the top and bottom of the latter, a buckle means engaging said latch in detachable fashion and securing the other end of said band, a ring secured to said collar near said buckle, and means for locking said buckle and ring together to prevent the release of said collar from said dog.

2. A collar for attachment to a dog, consisting of a band having a pressure releasable latch comprising an upper and lower plate secured to one of its ends respectively at the top and bottom of the latter, a buckle engaging said latch in detachable fashion for securing the other end of said band upon said dog; said buckle being adapted to be released from said latch upon the application of a suitable force.

3. A collar provided with a neck-band; a pressure releasable latch comprising a pair of companion plates respectively secured to the top and bottom portions of one end of said band, and extending beyond said band in spaced relation to each other so as to provide an ingress and egress into a chamber formed by said band and plates; a buckle means releasably engaging said latch and selectively securing any desired part of the other end of said band; said buckle being adapted to be released from said latch upon the application of a suitable force upon said collar.

4. The structure of claim 3, in which a ring is mounted in pivotal fashion to a keeper in said top plate so that said ring and buckle may be secured by a latch to prevent disengagement of said buckle from said latch.

References Cited in the file of this patent

UNITED STATES PATENTS

| | | |
|---|---|---|
| 904,530 | Harlow | Nov. 24, 1908 |
| 1,800,756 | Sass | Apr. 14, 1931 |
| 2,370,232 | Creekbaum | Feb. 27, 1945 |
| 2,612,139 | Collins | Sept. 30, 1952 |
| 2,994,300 | Grahling | Aug. 1, 1961 |
| 3,011,478 | Kirby | Dec. 5, 1961 |